United States Patent [19]

Klatt

[11] Patent Number: 4,598,374

[45] Date of Patent: Jul. 1, 1986

[54] GEARSHIFT SELECTION SYSTEM FOR A POWER-ASSISTED TRANSMISSION

[75] Inventor: Alfred Klatt, Wathlingen, Fed. Rep. of Germany

[73] Assignee: WABCO Westinghouse Fahrzeugbremsen GmbH, Hannover, Fed. Rep. of Germany

[21] Appl. No.: 535,485

[22] Filed: Sep. 26, 1983

[30] Foreign Application Priority Data

Oct. 9, 1982 [DE] Fed. Rep. of Germany ....... 3237508

[51] Int. Cl.⁴ ..................... G05G 5/04; F16H 57/06; F16H 5/80
[52] U.S. Cl. .................................. 364/424.1; 74/475; 74/752 D; 74/859; 74/DIG. 6
[58] Field of Search ............. 74/365, 861, 866, 752 D, 74/859, 475; 364/424.1

[56] References Cited

U.S. PATENT DOCUMENTS 4,361,060 11/1982 Smyth ................................. 74/866
4,425,620 1/1984 Batcheller et al. ............... 364/424.1
4,507,736 3/1985 Klatt ................................. 364/424.1

FOREIGN PATENT DOCUMENTS 3032403 4/1982 Fed. Rep. of Germany ... 364/424.1

Primary Examiner—Felix D. Gruber
Attorney, Agent, or Firm—J. B. Sotak

[57] ABSTRACT

A vehicle gearshift selection system for a multiple-speed power-assisted transmission having a gearshift lever which is shiftable into a single shift-up position or a single shift-down position. A gear sensor for monitoring the position of the gearshift lever and connected to an evaluation control circuit. The electronic evaluation control circuit is connected to the multiple-speed power-assisted transmission and receives signals concerning the prevailing driving conditions of the vehicle for engaging an optimum higher gear when the gearshift lever is shifted-up and for engaging an optimum lower gear when the gearshift lever is shifted-down.

14 Claims, 1 Drawing Figure

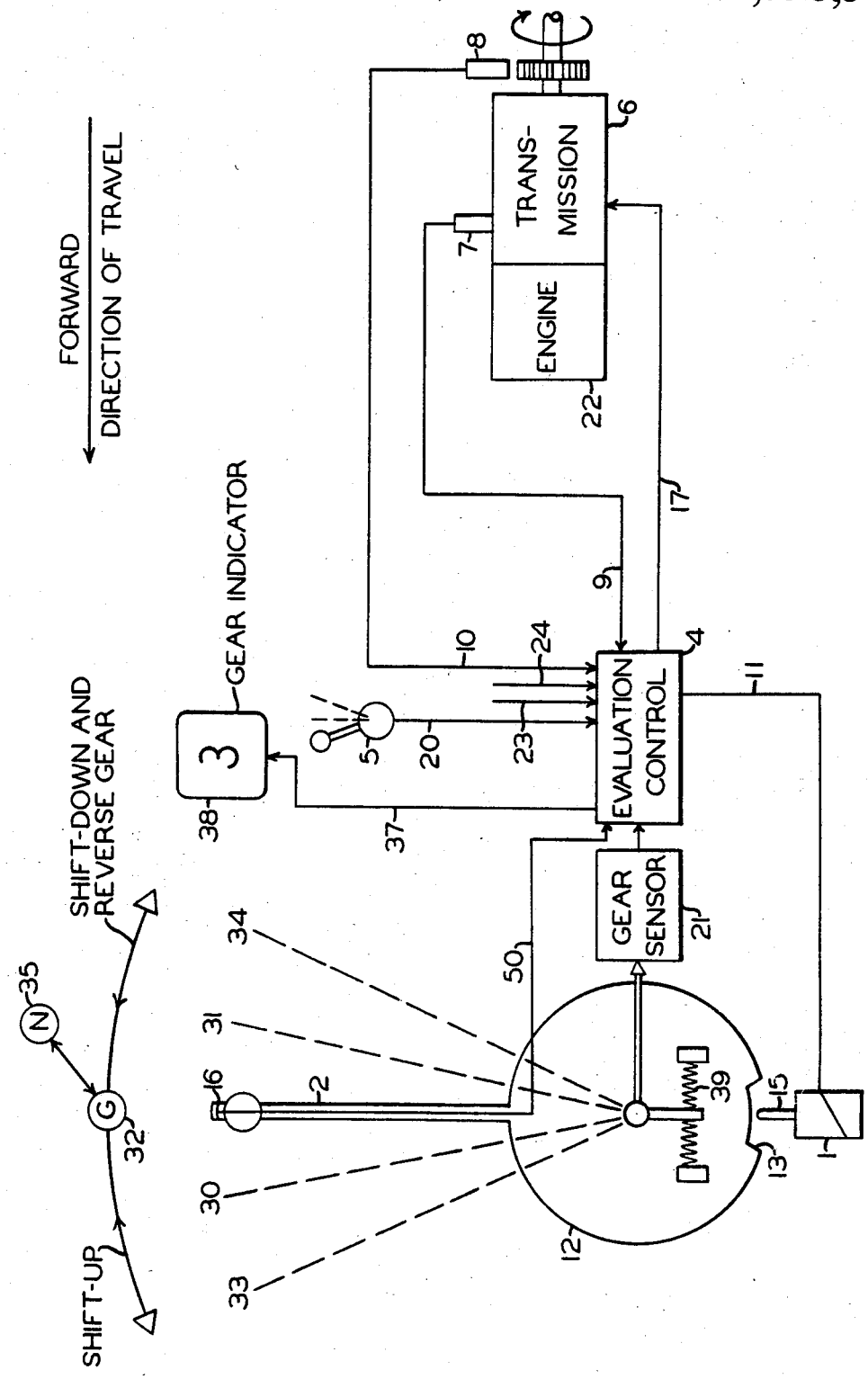

GEARSHIFT SELECTION SYSTEM FOR A POWER-ASSISTED TRANSMISSION

FIELD OF THE INVENTION

This invention relates to a gearshift selection system for a multiple-speed power-assisted transmission and, more particularly, to a gearshift arrangement for controlling the speed of a motor-driven transmission by selecting the appropriate gear in accordance with prevailing driving conditions at the time that the gearshift lever is shifted to cause a change in the gears.

BACKGROUND OF THE INVENTION

There are several well-known versions of gearshift mechanisms for motor vehicle transmissions. The most common type is the so-called H-gearshift configuration which is capable of controlling four forward speeds in passenger cars and four to sixteen forward speeds in commercial vehicles. However, there is a disadvantage in an H-gearshift in that it is sometimes difficult to find a certain gear. This is especially true in commercial vehicles which have a relatively large number of speeds where one or more gears can be easily skipped or missed.

There is also another known gearshift which is the socalled linear transmission which is shown and disclosed in my copending application U.S. Ser. No. 348,038 now U.S. Pat. No. 4,507,736, issued on Mar. 26, 1985. In this lattermentioned gearshift arrangement, the gears are selected by moving the gearshift lever along a straight path in one plane. In such a linear gearshift, it is sometimes difficult to find a certain speed, particularly in transmissions having many gears, since the individual gear positions are very close to each other. This makes the operation of the vehicle difficult since the driver, in many cases, has to look at the gearshift lever when he is shifting gears.

OBJECTS AND SUMMARY OF THE INVENTION

Accordingly, it is an object of this invention to provide a unique gearshift mechanism which can be easily and quickly shifted through a great number of speeds without distracting the driver.

Another object of this invention is to provide a new and improved gearshift selection system for a vehicular transmission which simply requires a single forward or rearward movement of the shift lever for causing an upward or downward change of the gears.

A further object of this invention is to provide a gearshift selection system for a multiple-speed power-assisted transmission comprising, a gearshift lever having a single shift-up position and a single shift-down position, a gear sensor for sensing the position of the gearshift lever, and an evaluation control circuit for evaluating the prevailing driving conditions of a vehicle and for shifting the multiple-speed power-assisted transmission into an appropriate gear in accordance with the driving conditions when the gearshift lever is shifted to the shift-up or shift-down position.

Yet another object of this invention is to provide a gearshift control arrangement comprising, a gearshift lever connected to a gear sensor, the gear sensor connected to an evaluation control circuit, the evaluation control circuit connected to a power-assisted transmission which is driven by an internal combustion engine, a first sensor for measuring the output speed of the power-assisted transmission, a second sensor for monitoring which gear of the power-assisted transmission is presently engaged, signals representing the prevailing driving conditions fed to the evaluation control circuit, the evaluation control circuit connected to a stopping device which limits the movement of the gearshift lever between a shift-up position and a shift-down position and causing the power-assisted transmission to engage an optimum gear in accordance with the prevailing driving conditions when the gearshift lever is moved to the shift-up and shift-down positions and for unlatching the stopping device for permitting the gearshift lever to be moved beyond the shift-up and shift-down positions to acknowledge engagement of the optimum gear. An essential point of the present invention is that it is no longer necessary to assign a fixed position of a shift lever for each speed of the gearshift, but rather, there are two positions of a shifting command generator which correspond to the shift commands, such as, "shift-up" and "shift-down", respectively.

In accordance with the present invention, there is provided a vehicular gearshift selection system for a multiple-speed power-assisted transmission having a gearshift lever which may be moved from a biased center position to either a shift-up or a shift-down position to cause a change in gear ratio to alter the speed of the vehicle. The position of the gearshift lever is monitored by a gearshift sensor which transmits a coinciding code signal to an evaluation control circuit. The evaluation control circuit conveys control signals to the power-assisted transmission to cause a power shifting of the gear train to the proper gear. The evaluation control circuit may include a suitable commercially available microcomputer which receives feedback signals from an output speed sensor and a gear-position sensor. A driving program selector also supplies an operating mode signal to the microcomputer to establish a mode of operation. Further, signals representing the load on the vehicle and the position of the gas pedal may be fed to the microcomputer to provide additional data for selecting the optimum gear ratio and engine speed.

DETAILED DESCRIPTION OF THE INVENTION

The transmission shift control system basically includes a gearshift lever 2, a gearshift locking device 1, a gearshift sensor 21, an electronic evaluation control circuit 4, a driving program selector 5, an internal combustion engine 22, an automatic transmission 6, a transmission gear position sensor 7, and a transmission output speed sensor 8.

As shown in the single FIGURE, the internal combustion engine 22 is flange-connected to an automatic power-assisted transmission 6. The electronic evaluation control circuit 4 is electrically connected by lead 10 to the speed sensor 8 which provides a feedback signal in accordance with the output speed of the transmission. The second sensor 7 monitors the gear position of the transmission and conveys a feedback signal to the evaluation control circuit 4 via lead 9. Further, leads 23 and 24 convey feedback signals to the evaluation control circuit 4 is accordance with the load of the vehicle and the position of the accelerator pedal or the governor rod distance at the fuel-injection pump, respectively. Furthermore, the driving program selector 5 conveys a signal to the evaluation control circuit 4 via a lead 20. The selector 5 is arranged to select various driving programs, such as, "steady speed" or "economical", "city" or "cross-country". A speed sensor 21 monitors or senses the respective position of the gearshift lever 2 and supplies an input signal to the evaluation control circuit 4. From the received input data, the evaluation control circuit 4 calculates and computes an optimum operating gear in accordance with the selected driving mode program. Upon manipulation of the gearshift lever 2 in the direction of travel to position 30 (shift-up) or opposite to the direction of travel to position 31 (shift-down), the optimum gear selection signal is conveyed to the transmission 6 from the evaluation control circuit via lead 17. This signal will result in a shift to a higher or lower gear which is engaged by a power-assisting mechanism.

The main criteria for the calculation of the new gear is based upon the output speed of the transmission or vehicle speed, the r.p.m. of the engine, the postion of the gas pedal, and the load carried by the vehicle. The engine speed is readily computed from the information provided by the sensors 8 and 7. The exact circuitry and mode of operation with regard to the evaluation control circuit 4, which contains a microcomputer, is not a subject of the invention and therefore is not explained in more detail.

An additional output lead 37 is connected to the evaluation control circuit 4 for controlling a display gear indicator 38. The indicator displays the gear which has just been put into and/or the optimum proposed gear which is signaled by the evaluation control circuit 4.

A further output lead 11 is connected to the evaluation control circuit 4 which serves to control a latching or stopping device 1. The latching device 1 has a magnetically operated stop pin 15 which cooperates with a notch 13 formed on a gearshift plate 12 which is attached to gearshift lever 2.

The gearshift lever 2 has a center position 32 (G) to which it is automatically returned after a shifting movement. A biasing spring 39 returns the gearshift lever 2 to its central position after the lever is released by the operator of the vehicle.

In order to shift to neutral, the gearshift lever 2 can be moved from the center position 32 (G) into a neutral position 35 (N) by pushing at a right angle to the direction of the shifting movement.

In describing the function or mode of operation of the gearshift selection system, it will be assumed that the lever 2 and selector 5 are in the positions shown in the drawing, and that the vehicle is moving in the direction shown by the arrow. Now, if the driver wants to shift to a higher gear, he simply pushes the gearshift lever 2 forward or in the direction of travel initially to a gear selection position 30. Thereupon, the evaluation control circuit 4 computes and determines from the available data concerning the prevailing driving condition, the most suitable next highest gear. In the case shown, the next appropriate higher gear can be the fourth gear or even the fifth gear. Thus, an output signal signifying the proper gear is then communicated to the transmission 6 via the lead 17 which causes engagement by the power-assisting mechanism. As soon as the gearshifting is completed, the stopping device 1 is released by an output signal from the evaluation control circuit 4 on the lead 11. Thus, the gearshift lever 2 is released. Accordingly, it is now possible to push the lever all the way forward to the end position 33. In so doing, the driver is informed, without being distracted from traffic, that the requested gear has been engaged and that the engine can be re-engaged. The driver may now let go or release the gearshift lever 2. The lever is returned to the center position 32 by the biasing efforts of the spring 39.

A corresponding shifting method or procedure applies for the shifting down into a lower gear. To accomplish this, the gearshift lever 2 is first shifted into a gear selecting position 31 which is opposite to the direction of travel. After the gear shifting is completed, the lever is pushed into an end position 34. Again, the spring 39 serves the purpose of centering the gearshift lever 2 when the lever is released by the driver.

In the event that during the downward shift, the vehicle speed is nearly zero, or zero, the evaluation control circuit 4 automatically causes the engagement of the reverse gear.

If a stopped vehicle is shifted upwardly from a neutral or from a reverse gear, the transmission is shifted automatically either into first gear when the vehicle is loaded or climbing a hill, or into second gear when the vehicle is unloaded or decending a hill.

As shown, the gearshift lever 2 is provided with a key-operated switch which can be actuated by the driver and which is connected to the evaluation control circuit 4 by a lead 50. Thus, the optimum gear selection operation of the evaluation control circuit 4 can be suppressed by actuating the key switch. Accordingly, the evaluation control circuit is only capable of shifting one gear up or down.

In the gear selecting positions 30, 31, the evaluation control circuit 4 checks, prior to executing the shifting commands, whether the maximum allowable speed of the engine 22 is exceeded. If the maximum allowable engine speed is exceeded, the shifting does not take place and the existing engine speed is retained.

In order to ensure that the gear cylinders are properly working within the transmission 6, the evaluation control circuit 4 further suppresses any reshifting for at least one second after a speed has been changed.

The semiautomatic gearshift system described above enables a very simple gearshifting operation without distracting the driver from the traffic. The system can also be operated easily by inexperienced drivers. Compared to a fully automatic system, the subject system has the advantage that the wishes of the driver are taken into consideration.

It will be understood that various alterations and changes may be made by those skilled in the art without departing from the spirit and scope of the subject invention. Therefore, it will be appreciated that all modifications, ramifications, and equivalents will be readily comprehended by persons skilled in the art, and thus, it is understood that the invention is not limited to the exact embodiment described but is to be accorded the full scope and protection of the appended claims.

Having thus described my invention, what I claim as new and desire to secure by Letters Patent, is:

1. A gearshift selection system for a multiple-speed power-assisted transmission comprising, a gearshift lever means having a single shift-up position and a single shift-down position, a gear sensor means for sensing the position of said gearshift lever means, and an evaluation control circuit means for evaluating the prevailing driving conditions of a vehicle and for shifting the multiple-speed power-assisted transmission into an appropriate gear in accordance with the driving conditions when said gearshift lever means is shifted to the shift-up or shift-down position, said evaluation control circuit means produces an output signal for energizing a latching means which allows said gearshift lever means to be further shifted beyond the shift-up or shift-down position to signify the appropriate gear is engaged.

2. The gearshift selection system, as defined in claim 1, wherein said gearshift lever means is biased to a center position by spring means.

3. The gearshift selection system, as defined in claim 1, wherein said gearshift lever means has a center position centered by a spring and after a shifting action said gearshift lever means is returned to the center position by said spring.

4. The gearshift selection system, as defined in claim 1, wherein said gearshift lever means has a neutral position which is at a right angle to the shifting direction.

5. The gearshift selection system, as defined in claim 1, wherein a shift-up is in the forward movement of said gearshift lever means in driving direction and a shift-down is in the backward movement of said gearshift lever means.

6. The gearshift selection system, as defined in claim 5, wherein when said gearshift lever means is moved in the backward direction, the reverse gear is engaged when the vehicle speed is approximately zero.

7. The gearshift selection system, as defined in claim 1, wherein a switch is connected to said evaluation control circuit means to cause only one gear to be shifted-up or shifted-down.

8. The gearshift selection system, as defined in claim 1, wherein said evaluation control circuit means ensure the prevailing engine speed is less than the maximum rotational speed of the engine prior to shifting the multiple-speed power-assisted transmission.

9. The gearshift selection system, as defined in claim 1, wherein said evaluation control circuit means suppresses a renewed shifting for at least one second after said gearshift lever means is shifted.

10. The gearshift selection system, as defined in claim 1, wherein a gearshift indicator means is controlled by said evaluation control circuit means.

11. The gearshift selection system, as defined in claim 1, wherein a speed sensor means senses the output speed of the multiple-speed power-assisted transmission and feeds back a signal to said evaluation control circuit means.

12. The gearshift selection system, as defined in claim 1, wherein a gear position sensor means monitors the prevailing engaged gear and feeds back a signal to said evaluation control circuit means.

13. The gearshift selection system, as defined in claim 1, wherein signals representing the load on the vehicle and the position of the accelerator are fed to said evaluation control circuit means.

14. A gearshift control arrangement comprising, a gearshift lever means connected to a gear sensor means, said gear sensor means connected to an evaluation control circuit means, said evaluation control circuit means connected to a power-assisted transmission which is driven by an internal combustion engine, a first sensor means for measuring the output speed of said power-assisted transmission, a second sensor means for monitoring which gear of said power-assisted transmission is presently engaged, signals representing the prevailing driving conditions fed to said evaluation control circuit means, said evaluation control circuit means connected to a stopping means which limits the movement of said gear-shift lever means between a shift-up position and a shift-down position and causing said power-assisted transmission to engage an optimum gear in accordance with the prevailing driving conditions when said gearshift lever means is moved to the shift-up and shift-down positions and for unlatching said stopping means for permitting said gearshift lever means to be moved beyond the shift-up and shift-down positions to acknowledge engagement of the optimum gear.

* * * * *